United States Patent [19]

Azegami

[11] 4,387,601
[45] Jun. 14, 1983

[54] CAPACITANCE TYPE DISPLACEMENT CONVERSION DEVICE

[75] Inventor: Tadashi Azegami, Inagi, Japan

[73] Assignee: Hokushin Electric Works, Ltd., Tokyo, Japan

[21] Appl. No.: 275,510

[22] Filed: Jun. 19, 1981

[30] Foreign Application Priority Data

| Jul. 1, 1980 | [JP] | Japan | 55-89745 |
| Jul. 24, 1980 | [JP] | Japan | 55-101699 |
| Feb. 9, 1981 | [JP] | Japan | 56-18406 |
| Feb. 9, 1981 | [JP] | Japan | 56-18407 |
| Feb. 12, 1981 | [JP] | Japan | 56-19450 |
| Mar. 30, 1981 | [JP] | Japan | 56-46738 |

[51] Int. Cl.³ .............................................. G01L 9/12
[52] U.S. Cl. ........................................ 73/724; 73/718; 324/60 R
[58] Field of Search ..................... 73/718, 708, 724; 324/60 R, 60 CD, 60 C

[56] References Cited

U.S. PATENT DOCUMENTS

| 3,237,449 | 3/1966 | Brandt | 73/141 |
| 3,518,536 | 6/1970 | Lee et al. | 324/57 |
| 4,091,683 | 5/1978 | Delatorre | 73/718 |
| 4,187,460 | 2/1980 | Dauge et al. | 324/60 CD |

Primary Examiner—Donald O. Woodiel
Attorney, Agent, or Firm—Cushman, Darby & Cushman

[57] ABSTRACT

A capacitance type displacement conversion device is provided in which a physical displacement resulted from a change of a physical value such as pressure or tension is converted into an electrical signal. The device is comprised of a capacitance sensor and an improved circuitry whereby conversion characteristics are linear and free from erroneous measurements caused by distributed capacitances and other circuit elements related thereto. The type of the sensor may be either a single capacitance or a differential capacitance type.

14 Claims, 30 Drawing Figures ns4,387,601

CAPACITANCE TYPE DISPLACEMENT CONVERSION DEVICE

BACKGROUND OF THE INVENTION

This invention relates to a capacitance type displacement conversion device in which a physical displacement resulted from a change of a physical value such as pressure or tension is converted into an electrical signal.

Devices of the aforementioned type have been used for transmitting the electrical signal, converted from the detection output such as flow rate or pressure of the systems concerned, to a remote receiving station. Introduction of such devices to the systems enables to simplify the circuit configuration and to reduce the manufacturing cost. An improvement relating to such devices has been proposed by the applicant, and is disclosed in a Japanese patent application No. 55-29246 under the title of "Displacement Conversion Device."

One of the problems encountered in a conventional capacitance type sensor is that conversion characteristics is non-linear and moreover representative of an erroneous value due to a distributed capacitance between a stationary electrode and a movable electrode, and also due to a distributed capacitance between a case of the sensor and a stationary electrode or a movable electrode.

SUMMARY OF THE INVENTION

Accordingly, an object of the invention is to provide a capacitance type displacement conversion device in which the aforementioned problems are essentially eliminated with a relatively simple circuit configuration.

There is provided a capacitance type displacement conversion device according to the embodiment of this invention for measuring a physical displacement by converting a physical displacement detected by a capacitance type sensor into an electrical signal proportionate to the displacement comprising:

a sensor having a movable electrode plate responsive to a physical displacement and a stationary electrode plate, said sensor forming a capacitor having a capacitance value proportionate to the physical displacement to be measured, an amplification means having an input and two outputs, one of which is in the same phase with said input and the other in opposite phase with said input, one of said electrode plates being connected to said input and the other of said electrode plates being connected to said output which is in same phase with said input, and a constant current circuit connected between said input and said output which is in opposite phase with said input and allowing the constant current to flow in both directions.

According to another embodiment of this invention, there is provided, a capacitance type displacement conversion device for measuring a physical displacement by converting a physical displacement detected by a capacitance type sensor into an electrical signal proportionate to the displacement comprising:

a sensor having a movable electrode plate responsive to a physical displacement and two stationary electrode plates, said sensor forming two capacitors having one common terminal and at least one of the capacitance value of which is proportionate to the physical displacement to be measured, an amplification means whose input is connected to said common terminal and whose output is opposite in phase with said input, a constant current circuit connected between said input and output of the amplification means and allowing the constant current to flow in both directions, a counter means to count a predetermined number of the output signals of said amplification means, and a switching means which is driven by the output of said counter means to supply the output of said amplification means in same phase with said input selectively to either one of the terminals of said sensor other than said common terminal.

The two capacitors of the sensor may be used which operates differentially with each other.

DESCRIPTION OF THE PREFERRED EMBODIMENTS

The details of this invention will be described in conjunction with the accompanied drawings wherein preferred embodiments according to the invention are illustrated. First, one example of a single capacitance type sensor, which is applied to a first embodiment of this invention, is illustrated for a better understanding of this invention.

Figure 1:
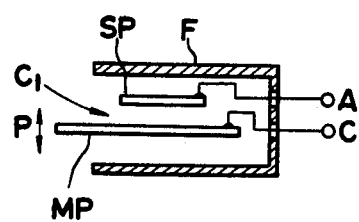
FIG. 1 is a cross sectional view showing one example of single capacitance type sensors.

FIG. 1 is a cross sectional view showing one example of a single capacitance sensor. A stationary electrode plate SP and a movable electrode plate MP are accommodated in a case F of the sensor to which plate MP a mechanical displacement force P in proportion to a physical displacement to be measured is applied, and hence the movable electrode plate MP is displaced. As a result, a static capacitance C, between both electrode plates SP and MP is varied in accordance with the change of the mechanical displacement force P.

Figure 2:
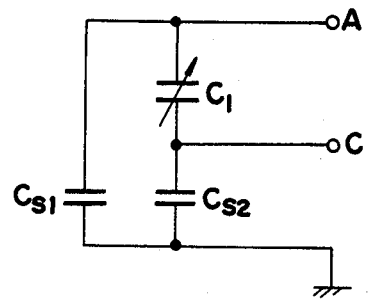
FIG. 2 is an equivalent circuit of FIG. 1, FIGS. 3, 4, 6 and 7 are circuit diagrams of first embodiments according to this invention.

FIG. 2 is an equivalent electrical circuit to FIG. 1 taken in consideration of the distributed capacitances. It is to be noted here that a conversion device must be configured by considering the presence of the distributed capacitances $Cs_1$ and $Cs_2$, the former capacitance being present between the stationary electrode plate SP and the case F, the latter between the movable electrode plate MP and the case F.

(1) A first embodiment

Figure 3:
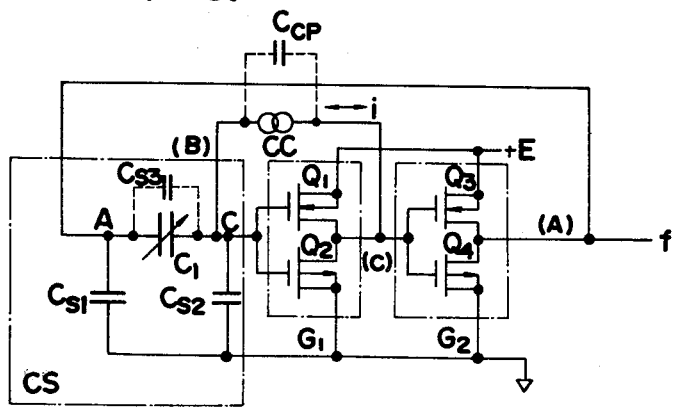

Referring to FIG. 3, a circuit diagram showing a first embodiment of this invention is illustrated. The circuit is adapted to be applied to a single capacitance type sensor having an equivalent circuit shown in FIG. 2. In the circuit, a first and second inverter G1 and G2 are comprised of four CMOS (Complementary Metal Oxide Semiconductor) type FETs (Field Effect Transistors) Q1 to Q4, and connected each other in a cascaded fashion. The electrostatic capacitance C1 of the single capacitance type sensor Cs is connected in series between the output of the second inverter G2 and the input of the first inverter G1, and a constant current circuit CC is connected across the input and output of the first inverter G1. The circuit thus constructed is summarized in principle in that the cascaded first and second inverters G1 and G2 function as an amplification means such that the output of the second inverter G2 is positively fed back through the electrostatic capacitance C1 to the input of the first inverter G1, and the output of the first inverter G1 is negatively fed back through the constant current circuit CC to the input of the first inverter G1. The same principal operation as in FIG. 3 may be attained by other circuit configurations, such as one depicted in FIG. 4. The embodiment shown in FIG. 4 is constructed such that a non-inverting amplifier G1 comprised of such as an operational amplifier or Schmidt trigger is used for feeding back the output of the amplifier G1 through an electrostatic capacitor C1 to the input, and an inverter G2 is connected in reverse and parallel relation to the amplifier G1, being interposed with the constant current circuit CC, between the input of the amplifier G1 and the output of the inverter G2.

Figure 5:
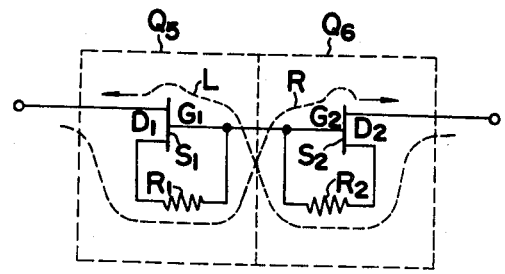
FIGS. 5, 5A and 8 are circuit diagrams illustrating a constant current circuit applied to this invention, FIGS. 9 and 10 respectively show waveforms appearing at the circuits of the first embodiments.

One example of the circuit diagram of the constant current circuit CC is shown in FIG. 5, in which two FETS' Q5 and Q6 are connected in series to each other to form a dual directional constant current circuit, the gates G1 and G2 being coupled directly and supplied with negative feed back voltages developed across the respective resistor R1 and R2 which are connected between the gates G1 and G2, and sources S1 and S2 of the respective FETs'. This constant current circuit CC may also be embodied by connecting each FET in reverse relation to the embodiment shown in FIG. 5, in which the gates serve as the input and output of the constant current circuit, and the drains are connected with each other as hereinafter illustrated in FIG. 21.

Figure 4:
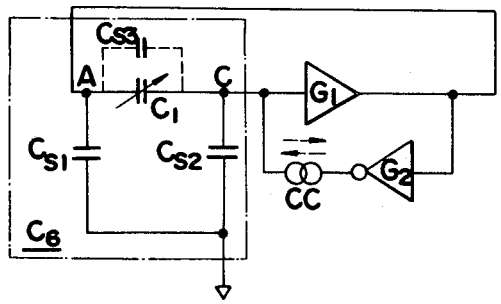
Figure 6:
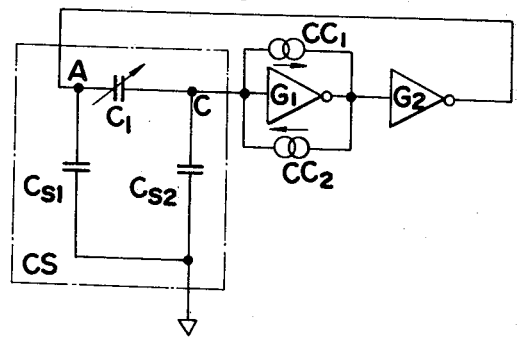
Figure 7:
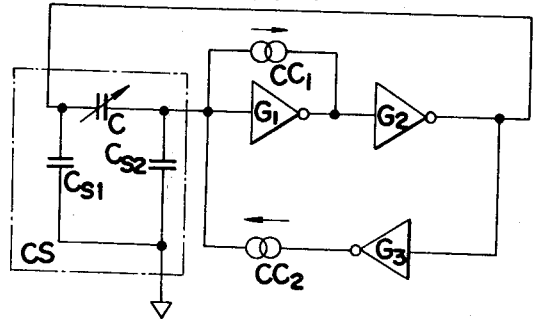
Figure 8:
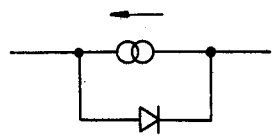

Circuit configurations other than those in FIGS. 3 and 4 may be accomplished either by employing two uni-directional constant current circuits arranged in reverse and parallel relation to each other as shown in FIGS. 6 and 7, or by employing an uni-directional constant current circuit and a diode as shown in FIG. 8.

For better understanding of the constant current circuit, the principles on which the circuit operates are briefly described, and other modifications are also provided. Referring back to FIG. 5 and assuming that the drain D2 is supplied with a higher potential than that supplied to the drain D1, then the current passing through the FETs Q5 and Q6 is shown in a dotted line L which takes a route through drain D2, source S2, resistor R2, gate G and drain D1. In this case the FET Q5 functions as a forward biased diode, while the FET Q6 functions as a constant current device which controls the current by means of a negative feed back via the resistor R2 so as to set it to a value of the pinch-off voltage of the FET Q6 devided by the resistance of the resistor R2. When the polarity of the supplying potentials are changed, the operation of the circuit is reversed, the current flow of which is shown by a dotted line R. Thus, the constant current circuit of the dual directional type is attained.

Figure 5A:
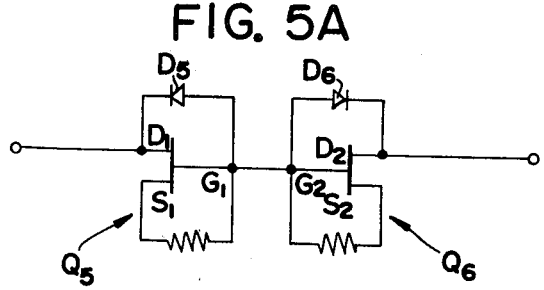

The constant current circuit of the dual directional type inherently generates a peak charging current at the time of change of the current direction from one to the other. This is because the space charge region or capacitance varies abruptly with the change from a forward bias to a reverse bias or vice versa and necessitates to compensate for the space charge. In view of this phenomenon and when necessary to prevent such a peak charging current to the extent that the displacement conversion device, according to this invention and using such a constant current circuit, can be operated satisfactorily without a considerable measuring errors, one example of circuit arrangements is proposed. The circuit for reducing the value of the peak charging current is constructed as shown in FIG. 5A such that diodes D5 and D6 are connected in parallel to the respective FETs Q5 and Q6. As a result, when a forward bias is applied between the gate and drain of one of the FETs, the corresponding diode D5 or D6, which is selected among the diodes having a smaller space charge capacitance and hence a lower barrier voltage than the FETs, by-passes the main portions of the current which might otherwise have flowed through the FET thereby considerably reducing the measuring errors.

It is to be noted that in the case of a dual directional constant current circuit when applied to the present invention, the limited current values of each direction may be different each other as is illustrated hereinafter.

The first embodiment illustrated in FIG. 3 operates at an oscillation frequency corresponding to the electrostatic capacitance C1 of the single capacitance type sensor, and delivers an output whose peak value generally reaches the value approximate to a source voltage E due to the application of CMOS type inverters. Now, returning back to FIG. 3, the operation of the first embodiment will be described in detail.

Figure 9:
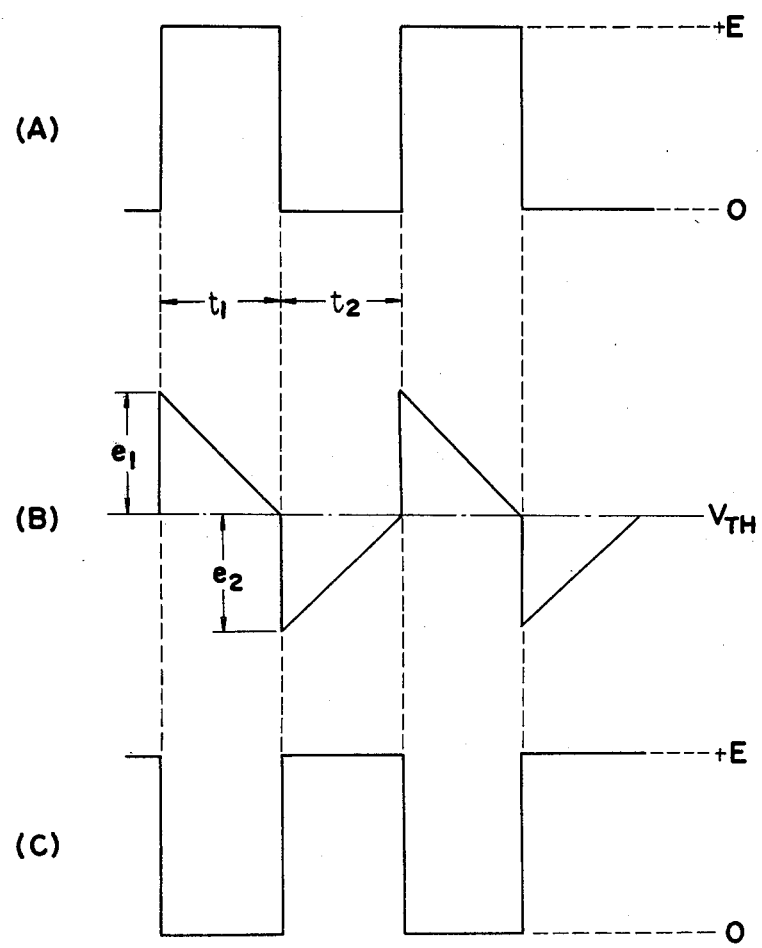

The waveforms at (A), (B) and (C) of FIG. 3 are illustrated in FIG. 9. When the output (A) of the second inverter G2 is rendered to be "H" (high level) having a voltage level of +E, the serial circuit composed of the electrostatic capacitance C1 and the distributed capacitance Cs2 is immediately charged at the time the waveform rises, so that the voltage across the distributed capacitance Cs2 rises immediately to a certain level as shown in the waveform (B) in FIG. 9. In this case since the output impedance of the second inverter G2 is substantially small, the distributed capacitance Cs1 may be neglected.

During the "H" condition of the output of the second inverter G2, the output (C) of the first inverter G1 retains "L" (low level), and the constant current circuit CC is connected between the input and output of the first inverter G1, so that the electrical energy supplied to the distributed capacitance Cs2 during charging operation is in turn discharged immediately through the constant current circuit CC and through the output impedance of the first inverter G1. The output (B) is decreased linearly because the discharging current is limited under a certain value by the constant current circuit CC. The output (B) decreases until it reaches a threshold level VTH where the output of the first inverter G1 takes another stable condition from "L" to "H". Thus, the output (A) of the second inverter G2 turns to "L" so that the output (B) is lowered to a certain level due to an immediate discharge of the distributed capacitance Cs2 through the capacitance C1. Thereafter, the distributed capacitance Cs2 is again charged by a constant current flowing through the constant current circuit CC due to the presence of the output (C), i.e., "H" level in this case. Resultantly, the output (B) increases linearly. The output (B) increases until it reaches the aforementioned threshold level VTH where the output (C) of the first inverter G1 turns to "L" and hence the output (A) of the second inverter G2 turns to "H". The output of the second inverter G2 charges the serial circuit composed of the electrostatic capacitance C1 and the distributed capacitance Cs2 in a similar manner as above, and the operation of charging and discharging is repeated successively.

The voltage swing e1 across the distributed capacitance Cs2 during charging operation is determined by the peak value E of the second inverter G2 divided by an impedance ratio of the electrostatic capacitance C1 to the distributed capacitance Cs2, taking the threshold level VTH as the voltage reference. Thus, the voltage swing e1 is shown in the following equation.

$$e_1 = \frac{C_1}{C_1 + C_{s2}} \cdot -E \quad (1)$$

The time ti required for the voltage swing e1 to reach the threshold level VTH is shown in the following equation.

$$i \cdot ti = e_1(C_1 + C_{s2}) \quad (2)$$

where i represents a constant value limited by the constant current circuit CC. From the above two equations (1) and (2), t1 is derived in terms of C1, E and i:

$$ti = C_1 \frac{E}{i} \quad (3)$$

After an appropriate repetition number of charging and discharging of the distributed capacitance Cs2, a reference potential corresponding to the threshold level VTH is determined, which serves as the center of charging and discharging operation. As a result, the voltage swing e1 in charging operation equals to the voltage swing e2 in discharging operation. This results in a coincidence of charging time t2 with the time ti because the charging operation to restore the voltage swing e2 to the threshold level VTH is accomplished by a constant current i flowing through the constant current circuit. This is represented by:

$$t1 = t2 \quad (4)$$

Therefore, an oscillating frequency f is shown in the following equation:

$$f = \frac{1}{t1 + t2} = \frac{i}{2 \cdot C_1 \cdot E} \quad (5)$$

By using a constant K, which is determined by a current i and a source voltage E, the above equation (5) is represented in a more simple form:

$$f = \frac{1}{C_1} \cdot K \quad (6)$$

It is readily appreciated from the euation (6) that the oscillating frequency corresponds to the electrostatic capacitance C1, and the adverse effect of the distributed capacitances is fully eliminated. Further, if there is a distributed capacitance Cs3 in parallel with the electrostatic capacitance C1, the effect of the capacitance Cs3 can be eliminated by adding a compensating capacitor Ccp having the same capacitance value as that of the capacitance Cs3 and being connected in parallel with the constant current circuit CC. This is because charging the distributed capacitance Cs3 is compensated by charging the capacitor Ccp.

Figure 10:
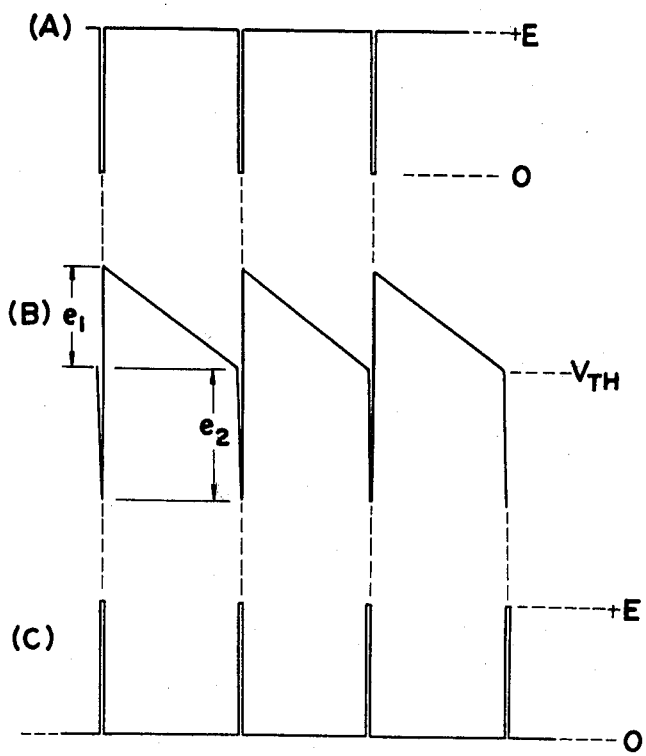

FIG. 10 shows waveforms corresponding to those in FIG. 9 in which one of the constant current circuit is composed of a diode as shown in FIG. 8. Due to the provision of the diode, the outputs (A) and (C) change to have steep negative and positive pulses, respectively.

(2) A second embodiment

Figure 11:
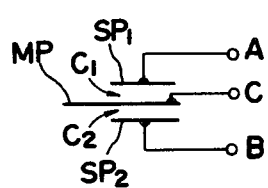
FIG. 11 is an illustrative circuit diagram showing a concept of a differential capacitance type sensor.

One example of a differential capacitance type sensor, which is applied to a second embodiment of this invention, is illustrated in FIG. 11 for understanding the principal concept thereof. The sensor of this type has two stationary electrode plates SP1 and SP2, and a movable electrode plate MP mounted between the two electrode plates SP1 and SP2 so as to form first capacitance C1 and second capacitance C2. These capacitances C1 and C2 varies in accordance with the mechanical displacement of the movable electrode plate MP between the two plates SP1 and SP2, which is displaced in response to a physical displacement to be measured.

Figure 12:
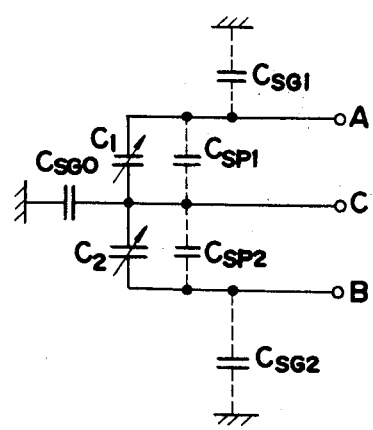
FIG. 12 is an equivalent circuit of FIG. 11, FIGS. 13 and 14 show cross sectional view of differential capacitance type sensors respectively with or without a shield.

In FIG. 12, an equivalent circuit of FIG. 11, when taken in consideration of distributed capacitances, is shown in which the distributed capacitances CSG1 and CSG2 respectively appearing across the stationary electrode plates SP1 and SP2, and the case of the sensor are added in the equivalent circuit between terminals A and B, and ground, the distributed capacitance CSGO appearing across the movable electrode plate MP and the case being added between terminal C and ground, and the distributed capacitances CSP1 and CSP2 being added between the terminals A-C and B-C, with parallel capacitances C1 and C2, respectively.

Figure 13:
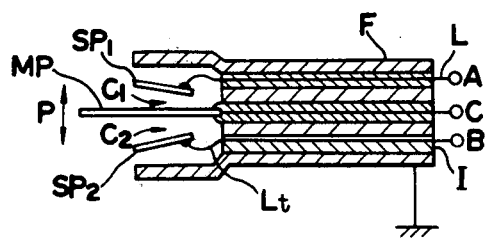
Figure 14:
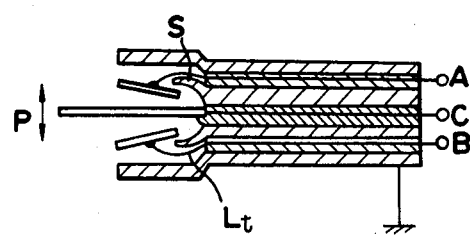

In FIG. 13, one example of a differential capacitance type sensor is shown in cross section, wherein stationary electrode plates SP1 and SP2, and a flexible movable electrode plate MP are mounted in a case F. The stationary electrode plates SP1 and SP2 are supported with lead wires L, while the movable electrode plate MP is fixed at its base with an insulating sealing material I such as glass. When a mechanical displacement force P is applied to the tip of the movable electrode plate MP, the first and second electrostatic capacitances C1 and C2 of the sensor vary in proportion to the mechanical displacement. A certain amount of constant electrostatic capacitances are formed between the end portion Lt of the lead wire L and the base portions of the movable electrode plate MP, which capacitances are represented by the distributed capacitances CSP1 and CSP2 in FIG. 12. The distributed capacitances CSP1 and CSP2 may be neglected by forming a project shield portion S between the end portion Lt of the lead wire L and the base portions of the movable electrode plate MP as shown in FIG. 14.

Figure 15:
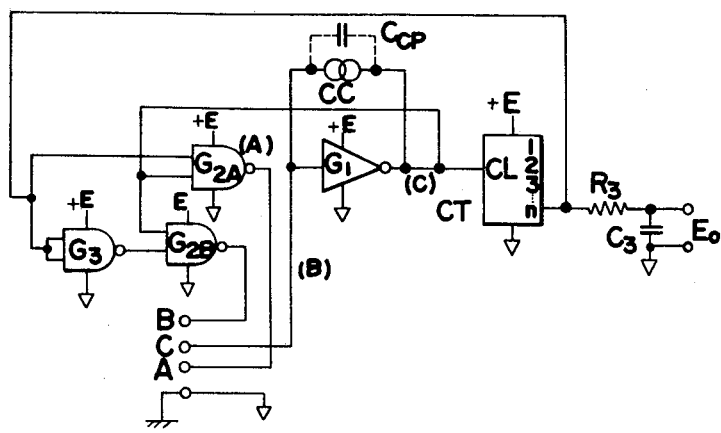
FIGS. 15 and 18 are circuit diagrams of second embodiments according to this invention.

Referring to FIG. 15, a circuit diagram showing a second embodiment according to this invention is illustrated. The circuit is adapted to be applied to a differential capacitance type sensor having an equivalent circuit shown in FIG. 12. The terminals designated as A, B and C in FIG. 15 are respectively connected to those terminals A, B and C of the sensor shown in FIG. 13 or FIG. 14.

(A) First, the operation of the circuit according to the invention, when the distributed capacitances CSP1 and CSP2 are neglected, will be described in detail.

First and second gates G2A and G2B are provided in the circuit, the inverted outputs of which are respectively supplied to the first and second capacitances C1 and C2 via the terminals A and C. When one of the gate, for example, the gate G2A delivers an output "H" having a voltage value of +E, a serial circuit composed of the first electrostatic capacitance C1 and the distributed capacitance CSG0 is immediately charged at the time of a rising edge of the output "H". As a result, the voltage at the terminal C, which forms a junction point between the first and second electrostatic capacitances C1 and C2, also rises immediately to a certain voltage level, as shown in FIG. 9(B).

Figure 16:
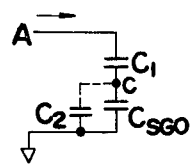
FIGS. 16 and 17 show equivalent circuits respectively for charging and discharging operation.

The equivalent circuit of the above charging operation is shown in FIG. 16. It is to be noted here that since the output impedance of the first gate G2A is so small as to neglect the presence of the distributed capacitance CSG1, and since the distributed capacitance CSG0 can be considered as being in parallel with the second electrostatic capacitance C2, the maximum voltage appearing at the terminal C can be determined by an impedance ratio of the first capacitance C1 to the parallel capacitances of the distributed capacitance CSG0 and the second capacitance C2.

During the period when the output of the first gate G2A holds "H", the output (C) of an inverter G1 maintains "L", and the constant current circuit CC is connected between the input and output of the inverter G1, so that the electrical energy supplied to the distributed capacitance CSG0 and the second electrostatic capacitance C2 during charging operation is in turn discharged immediately through the constant current circuit CC and through the output impedance of the inverter G1. The output (B) is decreased linearly because the discharging current is limited to a certain value by the constant current circuit CG. During this discharging period, the equivalent circuit may be shown as in FIG. 17 which clarifies the paths of discharging current into the constant current circuit CC from the capacitance C1 and the capacitance CSGO, the capacitance C1 still being applied with the output (A) of "H" in this discharging period.

The output (B) decreases until it reaches a threshold level VTH where the output (C) of the inverter G1 takes another stable condition from "L" to "H". Then, the output (A) of the first gate G2A turns to "L" so that the output (B) is lowered to a certain level due to an immediate discharge of the distributed capacitance CSGO and the second electrostatic capacitance C2 through the first electrostatic capacitance. Thereafter, the distributed capacitance CSGO and the second electrostatic capacitance C2 are again charged by a constant current flowing through the constant current circuit CC which is supplied with the voltage "H" of the output (C), thereby causing the output (B) to rise linearly. The output (B) increases until it reaches the threshold level VTH where the output (C) of the inverter G1 turns to "L" and hence the output (A) of the first gate G2A turns to "H". Therefore, the charging operation through the first gate G2A as described above is repeated successively in a similar manner as in FIG. 3.

Now, returning to FIG. 15, there is provided a counter CT which counts the output (C) pulses of the inverter G1. When the counter CT counts a predetermined number of pulses, the count output n delivers "L" in stead of the preceding state "H" until it counts again the same number of pulses. The "L" output is supplied to the second gate G2B through an inverter G3 so that the second gate G2B turns "ON" and the first gate G2A turns "OFF". At this instant the charging and discharging operation across the terminals B and C starts, and is repeated successively until the count output n turns to "H". The "H" output then initiates charging and discharging operation across the terminals A and C because at this instant the first gate G2A is changed to "ON" and the second gate G2B is charged to "OFF". Thus, the charging and discharging operation is switched at a predetermined time interval between across the terminals A and C, and across the terminals B-C, in response to the ON conditions of the first and second gates G2A and G2B.

Figure 18:
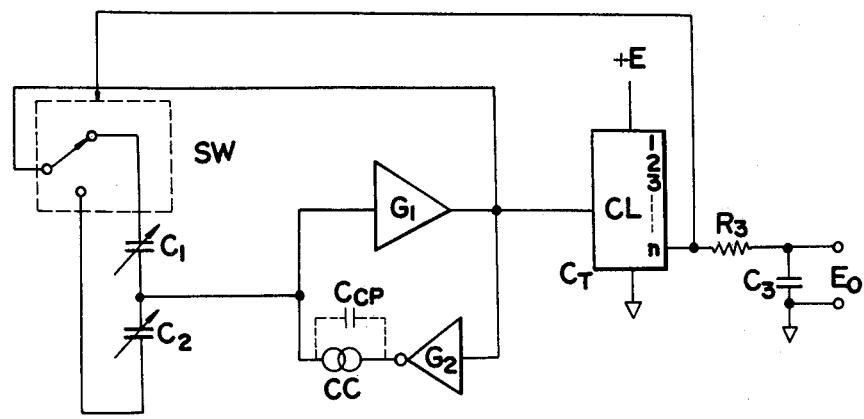

It is readily understood that the first and second gates G2A and G2B respectively function as a switching means which selectively supplies the output of an amplification means through a feed-back means to either one of the first and second electrostatic capacitances without changing the phase of the output. Accordingly, an alternative circuit can be embodied by using a non-inverting amplification means substituting for the inverter G1, and by using a more simplified switching circuit than the first and second gates which constitute the switching means. This concept is shown in FIG. 18 in which a switching circuit to be controlled by the output of the counter CT is designated by a symbol SW.

A brief circuit analysis will now be given to the circuit thus constructed. With the threshold level VTH used as the reference voltage, the voltage swing E1 across the distributed capacitance CSGO is shown in the following equation where Ct represents a sum capacitance of the distributed capacitance CSGO and the second electrostatic capacitance C2.

$$e1 = \frac{C1}{C1 + Ct} \times E \tag{11}$$

The time t1 required for the voltage swing e1 to reach the threshold level VTH is shown in the following eauation, considering the equivalent circuit shown in FIG. 17 and using i for the constant current supplied from the constant current circuit CC.

$$i \times ti = e1(C1 + Ct) \quad (12)$$

The time t1 is derived from the equations (11) and (12):

$$t1 = C1 \times \frac{E}{i} \quad (13)$$

After an appropriate repetition number of charging and discharging of the distributed capacitance CSGO, a reference potential corresponding to the threshold VTH is determined, which potential level serves as the center of charging and discharging operation. As a result, the voltage swing e1 in charging operation equals to the voltage swing e2 in discharging operation. On condition that the charging operation against the voltage swing e2 is carried out by a constant current i flowing through the constant current circuit CC, the time t2 required for charging is rendered to be equal to the time t1, and the following equation is correct in this case:

$$t1 = t2 \quad (14)$$

These equations are also true in the case of the charging and discharging operation across the terminals B and C. The first and second electrostatic capacitances C1 and C2 are interchanged with each other in FIGS. 16 and 17, and so the eauation (13) may be shown in the following:

$$t1 = C2 \cdot \frac{E}{i} \quad (15)$$

Accordingly, the periods during which the count output n of the counter CT holds "H" and "L" respectively correspond to the first and second electrostatic capacitances C1 and C2. The average output appearing at an integral circuit composed of a resistor R3 and capacitor C3 is therefore, representative of a duty ratio of the pulses outputted from the counter CT. This duty ratio in other words represents an operational result value of C1/(c1+Cs), which is used as an electrical convertion output E0 corresponding to the physical displacement force applied to the movable electrode plate.

(B) Next, the operation of the circuit will be described in which the effect of the distributed capacitances CSP1 and CSP2 are taken into consideration.

Figure 17:
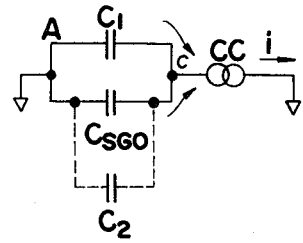
Figure 19:
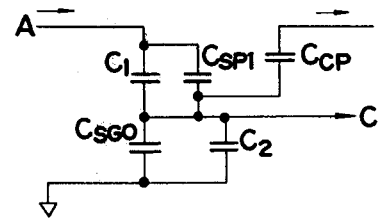
FIGS. 19 and 20 show equivalent circuits corresponding to FIGS. 16 and 17 when parallel distributed capacitances are taken into consideration, FIG. 20D show an improved circuit diagram which may be applied to this invention when particular count errors occur.
Figure 20:
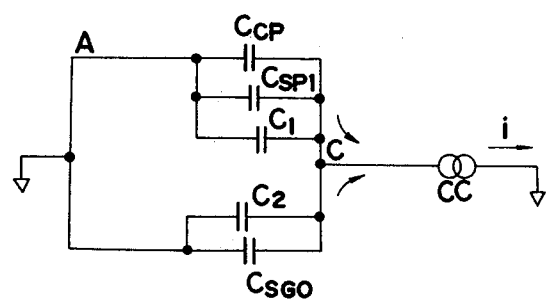

In FIGS. 19 and 20, the equivalent circuits similar to those in FIGS. 16 and 17 are shown with the distributed capacitance CSP1 and CS2 considered. From these equivalent circuits the following equations are derived in the same manner as the equations (11) and (12).

$$e1 = \frac{(C1 + CSP1)E}{C1 + CSP1 + CSGO + C2 + CCP} + \frac{CCP \cdot (-E)}{C1 + CSP1 + CSGO + C2 + CCP} \quad (16)$$

$$iK \cdot t1 = e1(CCP + CSP1 + C1 + C2 + CSGO) \quad (17)$$

Where CCP represents a compensation capacitance connected in parallel to the constant current circuit CC in FIG. 3. If the condition is met that the capacitance value of the compensation capacitance CCP is equal to that of the distributed capacitance CSP1, the effect of this capacitance CSP1 upon the output (C) is dispense with because the charging of the capacitance CSP1 is compensated by the compensation capacitance CCP, which is illustrated in FIG. 19 schematically.

By combining the eauations (16) and (17), the time t1 can be represented in a simplified equation:

$$t1 = (C1 + CSP1 - CCP) \cdot \frac{E}{i} \quad (18)$$

The condition CSP1=CCP is here applied to the above equation (18), then the similar equation to those of (13) and (15) are derived:

$$t1 = Ci \cdot \frac{E}{i} \quad (19)$$

In practice, the distributed capacitances CSP1 and CSP2 have substantially the same values due to the symmetrical sensor construction, so that the compensation capacitances CCP having the same value may be employed in the circuit fabrication without adversely effecting upon the circuit operation to be aimed.

Figure 20A:
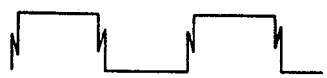
FIGS. 20A, 20B, 20C and 20E are waveforms for illustrating the circuit operation of that shown in FIG. 20D.
Figure 20B:
Figure 20C:
Figure 20D:
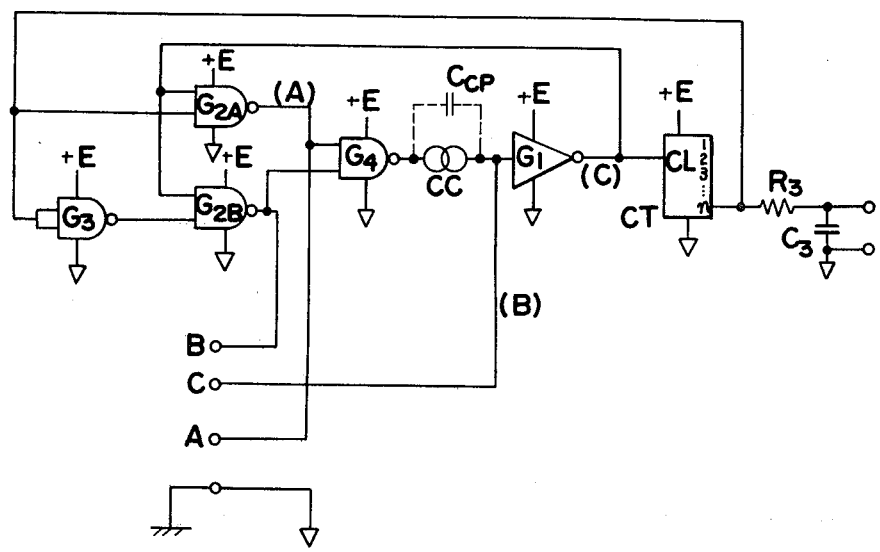
FIG. 20F is a similar circuit diagram as in FIG. 20D wherein NAND gates are replaced for NOR gates.
FIG. 20G shows an improved circuit diagram which may be applied to this invention without employing a compensation capacitance.
Figure 20E:
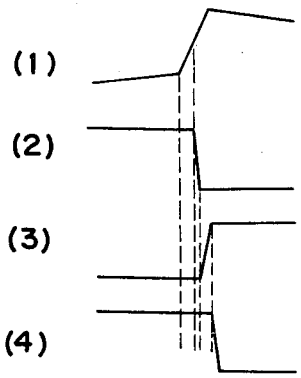
Figure 20F:
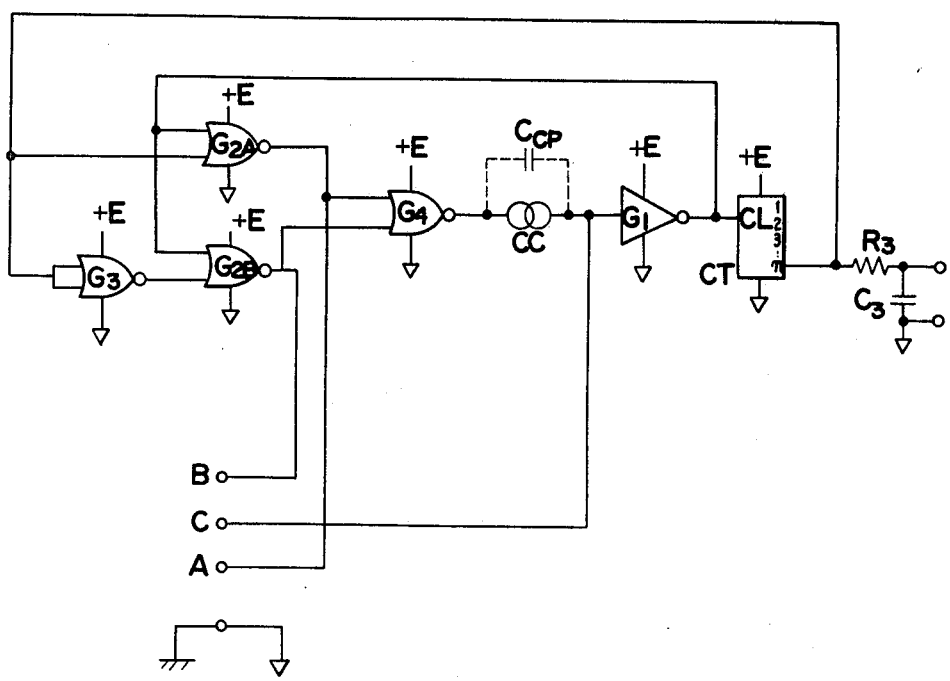

Miscounts may sometime occur when the output of the inverter G1 in FIGS. 15 or 18 is distorted at its rising and falling edges as shown in FIG. 20A. This distortion in the output waveform is generated owing to the fact that the input of the inverter G1 is supplied with two input signals, one being the inverted output through the constant current circuit CC and the other being the non-inverted output through the gates G2A and G2B and the capacitance of the sensor, so that the two signals interfere with each other at the vicinity of the threshold level due to a slight phase lag between the two signals. The waveform distortion near the threshold level in the input of the inverter G1 is illustrated in FIG. 20B where the abscissa is expanded in scale for clarification purpose. If the distortion occurs at the level apart from the threshold level as shown in FIG. 20C, no influence upon the output waveform is exerted. Therefore, it is suggested to compel one of the two signals, e.g., a signal through the constant current circuit CC to be subjected to a more slight phase lag. This is accomplished for example by adding one inverter in the circuit. More specifically, one example of the circuit configuration is shown in FIG. 20D wherein similar designations to those used in FIG. 15 are employed in FIG. 20D where appropriate. The difference between the circuits are that the outputs of the first and second gates G2A and G2B are fed to the inputs of the newly implemented NAND gate G4 whose output is delivered to the input of the inverter G1 through the constant current circuit CC. Thus, the input signal being supplied from the constant current circuit is sufficiently delayed to ensure the waveform distortion in the input of the inverter G1 to be generated at the level apart from the threshold level as shown in FIG. 20C. Accordingly, the output waveform is not affected thereby to lead a correct count of the counter CT. In FIG. 20E, the waveform (1) designates an input of the inverter G1, (2) is an output of the inverter G1, (3) is an output of the first gate G2A or the second gate G2B, and (4) is an output of the NAND gate G4. The gates in FIG. 20D can be replaced by NOR gates as illustrated in FIG. 20F.

As is readily understood from the above description, the capacitance type conversion device in accordance with the present invention can attain linear conversion characteristics with a relatively simple circuit configuration. This accounts for the fact that firstly the constant current circuit is employed and secondly the distributed capacitances CSG1, CSG2 and CSGO can be completely neglected and that the distributed capacitances CSP1 and CSP2 can also be neglected in view of the addition of the compensation capacitance CCP.

One of the modifications obtained from the preferred embodiments above is to replace either one of the first and second electrostatic capacitance C1 and C2 for the simple capacitance type sensor in FIG. 1, and to replace the other capacitance for a fixed standard electrostatic capacitance.

Figure 20G:
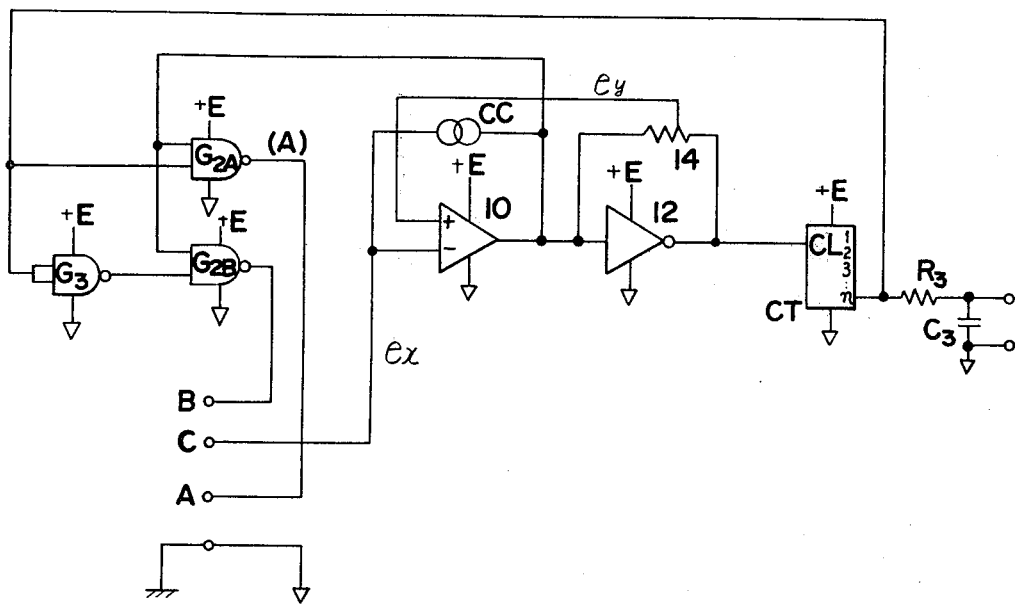

In addition to the above described embodiment in which the compensation capacitance CCP is added for cancellation of the effects of the distributed capacitances CSP1 and CSP2, another modified embodiment is proposed in FIG. 20G. This embodiment aims to omit the use of the compensation capacitance CCP which results in the necessity of rather cumbersome adjustments of the capacitance value. In FIG. 20G in which similar designations to those used in FIG. 15 are employed where applicable, the difference between the circuits resides in that a differential amplifier 10 and an inverter 12 are employed to supply the non-inverting input with a voltage $e_y$ and also to supply the inverting input with a voltage $e_x$. The voltage $e_y$ appears at the sliding tap of a resistor 14 and is controlled in proportion to the amount of the distributed capacitance CSP1 or CSP2, while the voltage $e_x$ is supplied from the sensor terminal C. The voltage $e_x$ is derived from the same eauation as that (11).

$$e_x = \frac{C1}{C1 + Ct} \cdot E \quad (20)$$

As is similar to the equation (12), in this case the following equation is introduced:

$$i \cdot t = (e_x \pm e_y) \cdot (C1 + Ct) \quad (21)$$

Where the designations $\pm$ respectively correspond to the sliding tap position either right hand side or left hand side from the central position.

From the two equations (20) and (21), the time t is shown.

$$t = \frac{E\,C1}{i} \pm e_y \cdot \frac{C1 + Ct}{i} \quad (22)$$

Since the current i and the capacitance C1+Ct is considered to be constant, the resultant t generated by supplying the voltage $e_y$ to the non-inverting input is rendered to be exactly proportionate to the voltage $e_y$. As a result, the effect of the distributed capacitances CSP1 and CSP2 can be canceled by adjusting the voltage $e_y$ appropriately without adding in parallel to the constant current circuit the compensation capacitance CCP.

(3) A third embodiment

Figure 21:
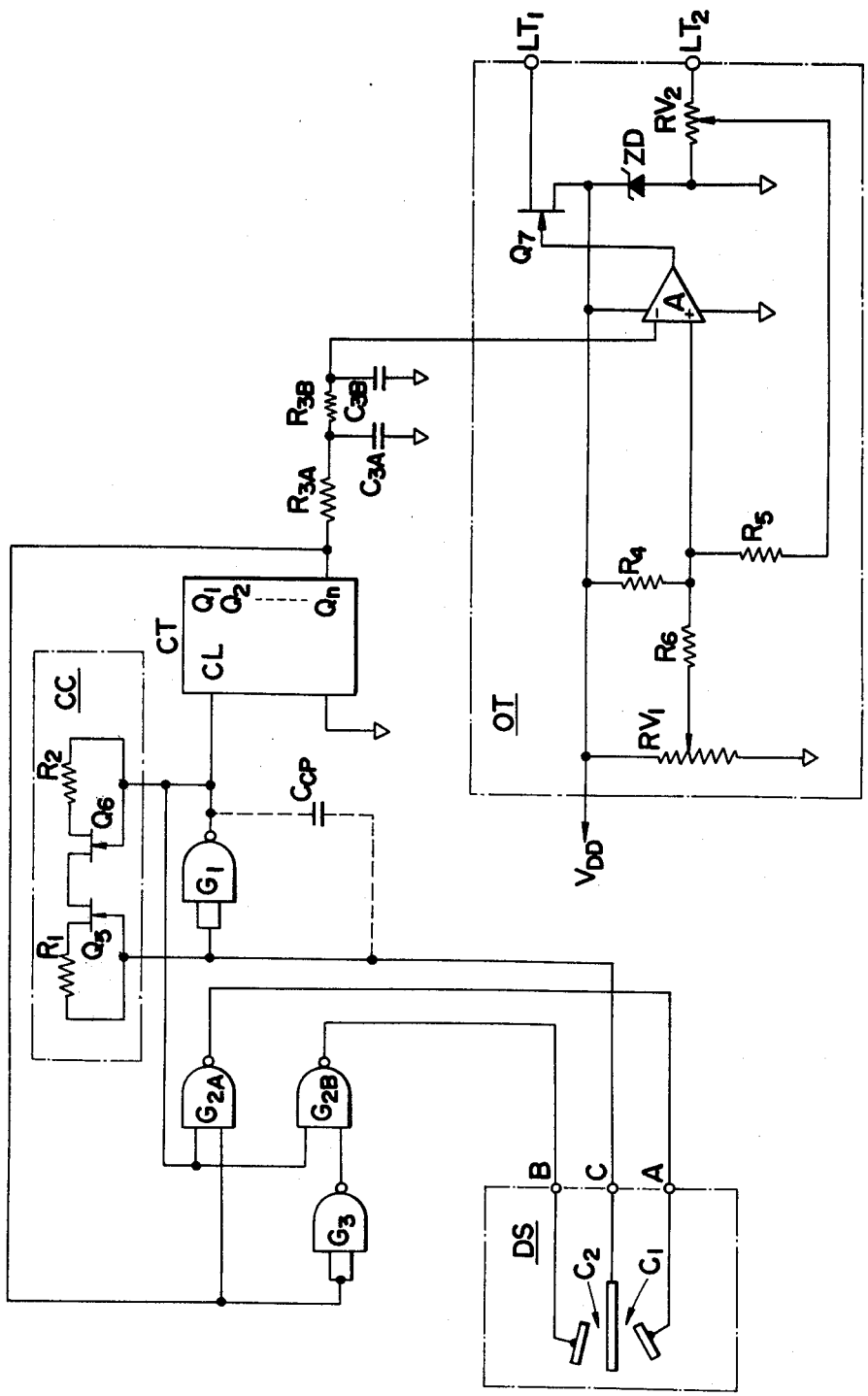
FIG. 21 shows a circuit diagram of a third embodiment according to this invention.
Figure 22:
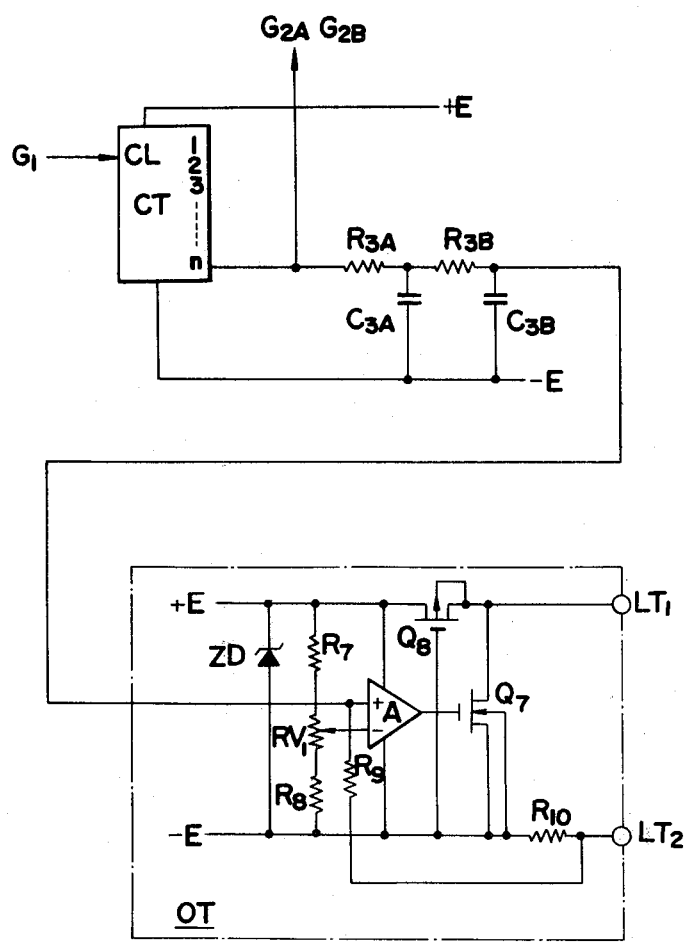
FIG. 22 is a circuit diagram which is capable of generating from the counter output, pulse signals having both polarities.

A circuit diagram showing a third embodiment according to this invention is illustrated in FIGS. 21 and 22, in which an output of the counter is integrated and then supplied to an output circuit having a signal transmission means of what is called as "a two wire type."

The embodiment shown in FIG. 21 has similar circuit elements as in FIG. 15, such as a differential capacitance type sensor DS, and an integrated circuit composed of resistors R3A and R3B and capacitors C3A and C3B.

The differences between the two embodiments reside in that a constant current circuit is used with the drains and sources connected in reverse relation to those in FIG. 5, and the output of the integrated circuit is supplied to an output circuit OT having a transmission means of a two wire type.

The output circuit OT is constructed mainly from a differential amplifier A the inverting input of which is supplied with the output of the integral circuit, and the non-inverting input being supplied with a standard voltage as set by a resistor network composed of resistors R4 and R5, and a potentiometer RV1 with a resistor R6 connected to a sliding tap thereof. Thus, the differential potential between two inputs is amplified to control a FET Q7 in reponse to the output of the differential amplifier A, thereby controlling currents flowing between two wire terminals LT1 and LT2 to which two wires for transmission of a displacement converted signal are respectively connected.

In the output circuit OT, there is provided a feed back potentiometer RV2 which detects a current flowing through the FET Q7 and a zener diode 2D, and feeds back a portion of the potential drop across the potentiometer RV2 to the non-inverting input of the amplifier A through a resistor R5. As a result, the current flowing between the two terminals LT1 and LT2 is balanced and stabilized to such a point as the both input voltages to the amplifier A equals each other. The source voltage for the amplifier is supplied from a receiving station not shown via the two wires for signal transmission to the terminals LT1 and LT2, and hence after stabilizing the source voltage with the zener diode 2D, a source voltage VDD is supplied to the associated circuit elements.

Moreover, as is common in the fields of industrial measurement, the range of currents flowing between the terminals LT1 and LT2 is set at a standard which covers over 4 to 20 mA. An idle current which passes through the transmission lines during the balancing of the differential capacitance type sensor DS is set at 4 mA by adjusting the potentiometer RVI, while the range of currents is controlled by adjusting the potentiometer RV2. Since the voltages supplied from each potentiometer RV1 and RV2 are independently supplied to the amplifier A, the adjustment of the idle current and the range of operating currents can be accomplished without interfering with each other. One modification of the third embodiment is illustrated in FIG. 22 in which pulse signals appearing at the count output n of the counter CT are transferred into signals having both polarities due to the provision of source voltages +E and —E to the counter CT. The output circuit CT in FIG. 22 is slightly different in construction from the output circuit CT in FIG. 21. The output circuit OT of this embodiment is constructed such that both the positive and negative source voltages +E and —E for use in the associated circuits are produced by stabilizing another source voltage of the receiving station by means of a constant voltage diode ZD and a constant current circuit made of a FET Q8. The voltage to the inverting input of the amplifier A is determined by resistors R7 and R8, and a potentiometer RV1, while the voltage to the non-inverting input is supplied from the output of the integral circuit composed of resistors R3A and R3B, and capacitors C3A and C3B. This output of the integral circuit corresponds to the operational result value of (C1−C2)/(C1+C2), which essentially means a cancellation of the same amount of variations in the capacitances C1 and C2. The operational result of (C1−Cs)/(C1+C2) can be led from the following analysis: The count output n of the counter CT holds a peak value +E when it is in a "H" state, and a peak value −E in a "L" state so that the average values after smoothed by the integral circuit represent the first electrostatic capacitance C1 in FIG. 15 during a "H" state, and the second capacitance C2 during a "L" state, respectively. The total sum of the two average values shows the operational result of (C1−C2)/(C1+C2).

The output of the integral circuit, i.e., the operational result (C1−C2)/(C1+C2), is supplied to the non-inverting input of the amplifier A where the potential difference between the both inputs of the amplifier A is amplified to control a FET Q7 so as to determine the current value flowing between the terminals LT1 and LT2. The stabilization of the current of FET Q7 is attained by a negative feed back of this current through resistors R9 and R10 to the non-inverting input.

The counter CT may preferably be made of CMOS type transistors in order to obtain a substantially equal peak value of pulse signals to source voltages +E or −E, and also in order to stabilize the peak value of the signals by means of stabilizing the source voltages +E and −E. This can also be applied to the counter CT shown in FIG. 21.

The counter CT used in FIGS. 21 and 22 may be replaced for a one-bit counter such as a flip-flop circuit. In this case, each delivery of an output signal of the inverter G1 shown in FIG. 9(C) causes the first and second gates G2A and G2B to change their on-off states. Other than CMOS transistors can be employed for the first and second gates G2A and G2B, and the inverter G1. However, some disadvantages are brought about in this case contrary to the CMOS transistors which restrain the output peak value approximate to the source voltages +E and −E thereby dispensing with other control means of the peak value, such as a switching circuit and hence simplifying circuit arrangements. Apart from this it is to be noted when CMOS transistors, which generally have a large input prohibiting diode at the input sides, are used, it is preferable to add a voltage deviding capacitor between the input of the inverter G1 and the reference potential so that the operation within a linear range of input-output characteristics may be insured. Some other modifications which are easily practiced by the person in ordinary skill can be made in a various forms, such as using the combination of AND gates and inverters in place of the first and second gates G2A and G2B, or using the output circuit OT having different circuit characteristics according to the application conditions.

Although the present invention has been described in connection with a limited number of embodiments, it will be readily apparent to persons skilled in the art that numerous changes and modifications may be made thereto without departing from the spirit of the invention and that the device may be used for measuring any type of force. Accordingly, the foregoing disclosure and description is for illustrative purposes only and does not in any way limit the invention which is defined only by the claims which follow.

What is claimed is:

1. A capacitance type displacement conversion device for measuring a physical displacement by converting a physical displacement detected by a capacitance type sensor into an electrical signal proportionate to the displacement comprising:
   a sensor having a movable electrode plate responsive to a physical displacement and a stationary electrode plate, said sensor forming a capacitor having a capacitance value proportionate to the physical displacement to be measured,
   an amplification means having an input and two outputs, one of which is in same phase with said input and the other in opposite phase with said input, one of said electrode plates being connected to said input and the other of said electrode plates being connected to said output which is in same phase with said input, and
   a constant current circuit connected between said input and said output which is in opposite phase with said input and allowing the constant current to flow in both directions.

2. A device according to claim 1, wherein amplification means is comprised of a first amplification means having said input and said output which is in opposite phase with said input, and a second amplification means whose input is connected to the output of said first amplification means and having said output which is in same phase with said input.

3. A device according to claim 1, wherein amplification means is comprised of a third amplification means having said input and said output which is in same phase with said input, and a fourth amplification means whose input is connected to the output of said first amplification means and having said output which is in opposite phase with said input.

4. A device according to claim 2 or 3, wherein said constant current circuit is comprised of first and second constant current circuits connected in parallel with each other independently allowing the constant current to flow in either one of the both directions.

5. A device according to claim 1, wherein said amplification means is comprised of a fifth amplification means having said input, a sixth amplification means whose input is connected to the output of said sixth amplification means and whose output functions as said output which is in same phase with said input, and a seventh amplification means whose input is connected to the output of said sixth amplification means, and said constant current circuit is comprised of third and fourth constant current circuits, said third constant current circuit being connected between the input and output of said fifth amplification means and said fourth constant current circuit being connected between the input of said fifth amplification means and the output of said seventh amplification means, said third and fourth constant current circuits allowing the constant current to flow in either one of the both directions.

6. A device according to claim 2 or 3, wherein said constant current circuit is comprised of fifth and sixth constant current circuits each being connected in serial and reverse relation with respect to the constant current direction to form a dual directional constant current circuit.

7. A device according to claim 6, wherein said fifth and sixth constant current circuits are further comprised respectively of a diode across each constant current circuit to bypass a main portion of a forward biased current flowing therethrough.

8. A capacitance type displacement conversion device for measuring a physical displacement by converting a physical displacement detected by a capacitance type sensor into an electrical signal proportionate to the displacement comprising:

a sensor having a movable electrode plate responsive to a physical displacement and two stationary electrode plates, said sensor forming two capacitors having one common terminal and at least one of the capacitance values of which is proportionate to the physical displacement to be measured, an amplification means whose input is connected to said common terminal and whose output is opposite in phase with said input, a constant current circuit connected between said input and output of the amplification means and allowing the constant current to flow in both directions, a counter means to count a predetermined number of the output signals of said amplification means, and a switching means which is driven by the output of said counter means to supply the output of said amplification means in same phase with said input selectively to either one of the terminals of said sensor other than said common terminal.

9. A capacitance type displacement conversion device for measuring a physical displacement by converting a physical displacement detected by a capacitance type sensor into an electrical signal proportionate to the displacement comprising:

a sensor having a movable electrode plate responsive to a physical displacement and two stationary electrode plates, said sensor forming two capacitors having one common terminal and two capacitors which operate differentially with each other, an amplification means whose input is connected to said common terminal and whose output is opposite in phase with said input, a constant circuit connected between said input and output of the amplification means and allowing the constant current to flow in both directions, a counter means to count a predetermined number of the output signals of said amplification means, and a switching means which is driven by the output of said counter means to supply the output of said amplification means in same phase with said input selectively to either one of the terminals of said sensor other than said common terminal.

10. A device according to claim 8 or 9, wherein said amplification means is comprised of first and second amplification means, the input of said first amplification means being connected to said common terminal and the output is same in phase with said input, said second amplification means being connected to the output of said first amplification means and whose output is opposite in phase with said input of the first amplification means, said constant current circuit is connected between said input of the first amplification means and said output of the second amplification means and allowing the constant current to flow in both directions, and said counter means is connected to said output of said first amplification means to count a predetermined number of the output signals.

11. A device according to claim 8 or 9 further comprising an integral circuit which smooths out the output of said counter, and an output means for converting the output of said counter into a current which flows through a two-lines type transmission line.

12. A device according to claim 8 or 9, wherein said switching means is comprised of first, second and third gates, the outputs of said first and second gates being connected to the respective terminals of said sensor other than said common terminal, the inputs of said first and second gates being driven by the output of said amplification means and also respectively driven either directly by the output of said counter means or through said third gate.

13. A device according to claim 12, further comprising a fourth gate whose inputs are connected to the outputs of said first and second gates, and whose inverted output is connected through said constant current circuit to the input of said amplification means.

14. A device according to claim 8 or 9, wherein said amplification means is comprised of a third amplification means which is of a differential type with inverting and non-inverting inputs and an output, the inverting input being connected to said common terminal of the sensor, and said constant current circuit is connected between the non-inverting input and the output of said third amplification means, said amplification means being further comprised of a fourth amplification means whose input is connected to the output of said third amplification means and whose inverted output is connected to said counter means, a voltage divider means being connected between the input and output of said fourth amplification means and the output of said voltage divider being fed to said non-inverting input of the third amplification means.

* * * * *